United States Patent
Cordeiro

(10) Patent No.: US 9,585,168 B2
(45) Date of Patent: Feb. 28, 2017

(54) BSS/PBSS SUPPORT AND SCHEDULE-FREE NETWORKING IN 60 GHZ

(71) Applicant: Intel Corporation, Santa Clara, CA (US)

(72) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 14/074,319

(22) Filed: Nov. 7, 2013

(65) Prior Publication Data

US 2014/0169288 A1 Jun. 19, 2014

Related U.S. Application Data

(63) Continuation of application No. 12/630,426, filed on Dec. 3, 2009, now Pat. No. 9,007,967.

(51) Int. Cl.
*H04W 74/04* (2009.01)
*H04W 84/12* (2009.01)
*H04W 8/18* (2009.01)

(52) U.S. Cl.
CPC ............ *H04W 74/04* (2013.01); *H04W 8/18* (2013.01); *H04W 84/12* (2013.01)

(58) Field of Classification Search
CPC ..................................................... H04W 74/04
USPC .................................. 370/310, 312
See application file for complete search history.

(56) References Cited

U.S. PATENT DOCUMENTS

| | | | |
|---|---|---|---|
| 6,917,598 B1 | 7/2005 | Emeott et al. | |
| 7,502,342 B2 | 3/2009 | Kim et al. | |
| 7,831,738 B2 | 11/2010 | Rofougaran | |
| 8,488,509 B2 | 7/2013 | Yi et al. | |
| 2004/0253996 A1 | 12/2004 | Chen et al. | |
| 2006/0045059 A1 | 3/2006 | Yun | |
| 2007/0032219 A1 | 2/2007 | Rudolf et al. | |
| 2007/0045424 A1 | 3/2007 | Wang | |
| 2007/0133448 A1* | 6/2007 | Gao et al. ............. | 370/311 |
| 2008/0095091 A1 | 4/2008 | Surineni et al. | |

(Continued)

FOREIGN PATENT DOCUMENTS

| | | |
|---|---|---|
| CN | 1723656 A | 1/2006 |
| CN | 1910861 A | 2/2007 |

(Continued)

OTHER PUBLICATIONS

International Search Report and Written Opinion corresponding to international patent application No. PCT/US2010/050015, mail date Jun. 29, 2011, a total of 10 pages.

(Continued)

*Primary Examiner* — Man Phan
*Assistant Examiner* — Pamit Kaur
(74) *Attorney, Agent, or Firm* — Sutherland Asbill & Brennan LLP

(57) ABSTRACT

In accordance with various aspects of the disclosure, an apparatus is disclosed that includes a network coordinator module configured to coordinate operation in one or more wireless network architecture modes and configured to communicate to a network station which mode of the one or more wireless network architecture modes is active for communication; and a scheduler module that is configured to schedule communication to the network station.

12 Claims, 3 Drawing Sheets

| B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|
| ESS | IB-SS | CF Pullable | CF POLL Request | Privacy | Short Preamble | PBCC | Channel Agility | Spectrum Mgmt. | QoS | Short Slot Time | APSO | Reserved | DSSS OFDM | Delayed Block ACK | Immediate Block ACK |

Octets ←————————— 2 —————————→

Capability information field in 802.11-2007 spec

(56) References Cited

U.S. PATENT DOCUMENTS

| | | |
|---|---|---|
| 2008/0137556 A1 | 6/2008 | Park et al. |
| 2008/0175265 A1 | 7/2008 | Yonge et al. |
| 2008/0247371 A1 | 10/2008 | Kwon et al. |
| 2009/0086659 A1 | 4/2009 | Pani et al. |
| 2009/0116461 A1 | 5/2009 | Yonge et al. |
| 2009/0257403 A1 | 10/2009 | Jeon et al. |
| 2010/0014458 A1 | 1/2010 | Singh et al. |
| 2010/0110951 A1 | 5/2010 | Park et al. |
| 2010/0135195 A1* | 6/2010 | Sakoda ............ 370/311 |
| 2010/0157927 A1 | 6/2010 | Mochizuki et al. |
| 2010/0203833 A1* | 8/2010 | Dorsey ............ 455/41.2 |
| 2010/0316032 A1* | 12/2010 | Chu et al. ............ 370/338 |
| 2011/0038290 A1 | 2/2011 | Gong et al. |

FOREIGN PATENT DOCUMENTS

| | | |
|---|---|---|
| CN | 1917462 A | 2/2007 |
| JP | 2004-128785 | 4/2004 |
| JP | 2012-517636 A | 8/2012 |
| WO | 2009-069091 | 6/2009 |
| WO | 2011/068585 A2 | 6/2011 |
| WO | 2011/068585 A3 | 8/2011 |

OTHER PUBLICATIONS

W. S. Conner et al., Capability Information Field Settings for Non-AP MPs to Ensure Backward Compatibility with Legacy STAs, doc: IEEE P802.11-y5/1045r0, Jul. 18, 2006, total of 3 sheets.

C. Cordeiro et al., Implications of usage models on TGad network architecture, IEEE 802.11-09/0391r0, Mar. 11, 2009, total of 11 sheets.

Japanese Office Action, Japanese Patent Application No. 2012-542000, issue date Sep. 3, 2013, total of 8 sheets.

Office Action received for Japanese Patent Application No. 2013-270863, mailed on Nov. 4, 2014, 2 Pages of English Translation and 2 Pages of Office Action.

International Preliminary Report on Patentability received for PCT Application No. PCT/US2010/050015, mailed on Jun. 14, 2012, 7 Pages.

Office Action received for Chinese Patent Application No. 201010540701.6, mailed on Jun. 24, 2013, 7 Pages of English Translation and 4 Pages of Office Action.

Office Action received for Chinese Patent Application No. 201010540701.6, mailed on Jan. 22, 2013, 9 Pages of English Translation and 6 Pages of Office Action.

Office Action received for Chinese Patent Application No. 201010540701.6, mailed on Feb. 8, 2014, 3 Pages of English Translation and 3 Pages of Office Action.

Office Action received for Chinese Patent Application No. 201010540701.6, mailed on Jun. 30, 2014, 5 Pages of English Translation and 3 Pages of Office Action.

Extended European Search Report for European Patent Application 14164162.1-1854 mailed Jul. 27, 2015. 8 pages.

Office Action issued in Chinese Patent Application No. 201310652887.8, dated Nov. 28, 2016, 19 pages.

* cited by examiner

|  | BSS type 405 | CBP only 410 | Reserved 415 |
|---|---|---|---|
| Bits: | B0-B1 | B2 | B3-B7 |

| B0 505 | B1 510 | BSS type 515 |
|---|---|---|
| 1 | 1 | Infrastructure BSS |
| 1 | 0 | PBSS |
| 0 | 1 | IBSS |
| 0 | 0 | Reserved |

BSS/PBSS SUPPORT AND SCHEDULE-FREE NETWORKING IN 60 GHZ

CROSS-REFERENCE TO RELATED APPLICATIONS

This Application is a continuation of U.S. patent application Ser. No. 12/630,426 filed Dec. 3, 2009, the entire contents of which are hereby incorporated by reference.

BACKGROUND

This disclosure relates generally to the field of wireless network communication, and in particular to a basic service set (BSS)/personal basic service set (PBSS) support and schedule-free networking in millimeter wave or high-frequency communication networks.

Devices in a wireless network operating, using the IEEE 802.11 architecture, are set up to either communicate with the assistance of a central station (STA)—an access point (AP)—or directly, one to the other, without any assistance from the access point. The first is called "Infrastructure Mode" and the other is called "Ad Hoc" mode (also called peer-to-peer or contention-free service). Either mode may be selected for a wireless network, however all devices communicating directly with each other must use the same mode. Beacon frames are used to signal which of these two modes is in operation within the network. The length of the beacon interval is a programmable parameter and it is adjusted with this invention so that an optimum amount of isochronous audio data can be sent to the receivers, with minimum system delay. A 802.11 network can operate according to a single one of these architectures at a time, and the architecture in use is signaled through the Capability Information field carried in the Beacon and Probe Response frames the AP transmits in an infrastructure BSS or a STA transmits in a IBSS. Standard usages for this wireless architecture include web browsing, internet access, backup, etc.

However, work has been initiated to amend the 802.11 standard for mmWave (60 GHz) usages, which are of very different nature than traditional 802.11 usages. Mmwave usages and applications include wireless display, sync&go, wireless computing, which are not covered by the 802.11 standard. MMW (millimeter band or mmW) is a radio frequency band having a wavelength of ten to one millimeter or from 30 to 300 Gigahertz in frequency. Compared to lower bands of radiation, terrestrial radio signals in this band are extremely prone to atmospheric attenuation, making them difficult to use of long distances.

Conventional scheduled access mechanisms, such as 15.3, WiMAX, etc., require the client STAs to decode and parse the network scheduling information, which tends to increase complexity at all STAs associated with the network. What is needed is to provide a simpler (schedule-free) implementations for scheduled access protocols.

DETAILED DESCRIPTION

Figure 1:
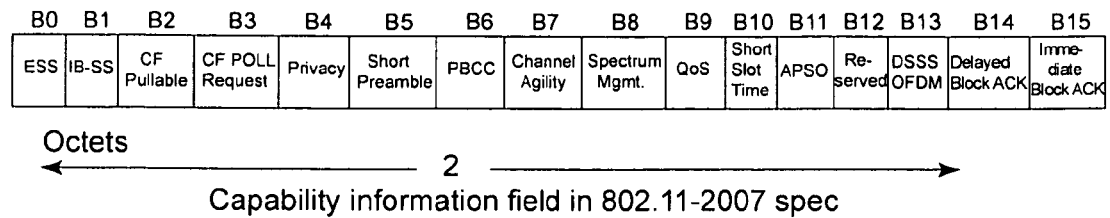
FIG. 1 shows a conventional Capability Information field in 802.11-2007 specification.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

DEFINITIONS

Access Point (AP): Any entity that has a station (STA) functionality and provides access to the distribution services, via the wireless medium (WM) for associated STAs.

Basic Service Set (BSS): A set of stations (STAs) that have successfully synchronized using the JOIN service primitives and one STA that has used the START primitive. Membership in a BSS does not imply that wireless communication with all other members of the BSS is possible.

Contention-free period (CFP): The time period during operation of a point coordinator function (PCF) when the right to transmit is assigned to stations (STAs) solely by a point coordinator (PC), allowing frame exchanges to occur between members of the basic service set (BSS) without contention for the wireless medium (WM).

Data transmission time (DTT): The time stations use to exchange data.

Extended service set (ESS): A set of one or more interconnected basic service sets (BSSs) that appears as a single BSS to the logical link control (LLC) layer at any station (STA) associated with one of those BBSs.

Independent basic service set (IBSS): A basis services set (BSS) that forms a self-contained network, and in which no access to a distribution system (DS) is available.

In 802.11, two network architectures are defined: infrastructure BSS (basic service set), or BSS for short, and IBSS (independent basic service set). A 802.11 network can operate according to a single one of these architectures at a time, and the architecture in use is signaled through the Capability Information field carried in the Beacon and Probe Response frames the AP transmits in a BSS or a STA transmits in a IBSS.

Infrastructure: The infrastructure includes the distribution system medium (DSM), access point (AP), and portal entities. It is also the logical location of distribution and integration service functions of an extended service set (ESS). An infrastructure contains one or more APs and zero or more portals in addition to the distribution system (DS).

Station (STA): Any device that contains an IEEE 802.11-conformant medium access control (MAC) and physical layer (PHY) interface to the wireless medium (WM).

Wireless medium (WM): The medium used to implement the transfer of protocol data units (PDUs) between peer physical layer (PHY) entities of a wireless local area network (LAN).

DESCRIPTION

In accordance with various embodiments of this disclosure, an apparatus is disclosed that comprises a network coordinator module configured to coordinate operation in one or more wireless network architecture modes and configured to communicate to a network station which mode of the one or more wireless network architecture modes is active for communication; and a scheduler module that is configured to schedule communication to the network station.

In accordance with various embodiments of this disclosure, a system is disclosed that comprises a wireless apparatus including network coordinator module configured to coordinate operation in one or more wireless network architecture modes and a scheduler module that is configured to schedule communication; a network station configured to receive communication from the wireless apparatus to determine which mode of the one or more wireless network architecture modes is active for communication.

In accordance with various embodiments of this disclosure, a method is disclosed that comprises appending a basic service set information bit-field to a capability information field in a frame by a network coordinator. For example, the frame is selected from the group consisting of: a beacon frame, an association response frame and a probe response frame. For example, the basic service set information bit-field is arranged to have a first value if the network coordinator transmits the frame and a second value if an access point other than the network coordinator is configured to transmit the frame.

In accordance with various embodiments of this disclosure, a method is disclosed that comprises transmitting a management/extension frame including a CBP only field by a wireless station, wherein the CBP only field is arranged to indicate whether the wireless station has included a schedule information element as part of the frame.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

FIG. 1 shows a conventional Capability Information field in 802.11-2007 specification. The conventional Capability Information field includes a number of subfields, such as subfields B0-B15 that are used to indicate requested or advertised optional capabilities. The length of the conventional Capability Information field is shown as 2 octets. Each Capability Information subfield can be interpreted according to a management/extension frame subtype. Of particular note, subfield B0 identifies ESS and subfield B1 identifies IBSS.

Figure 2:
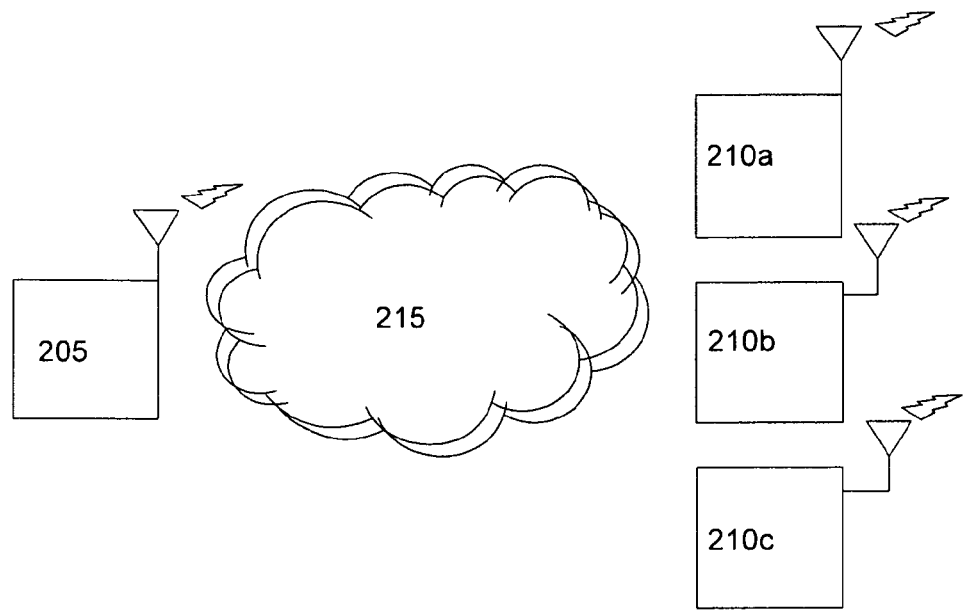
FIG. 2 shows an example network architecture in accordance with various aspects of the present disclosure.

FIG. 2 shows an example network architecture in accordance with various aspects of the present disclosure. A Personal Basic Service Set (PBSS) can be used to support mmWave usages. The PBSS can include a STA configured to operate as a network coordinator or a PCP (PBSS central point) 205 which can facilitate directionality in mmWwave or higher frequencies networks 215, such as networks operating at or near 60 GHz. In some aspects, PCP 205 can be replaced with an AP. The PCP can schedule communication amongst network STAs 210a, 210b and 210c. Network STAs 210a, 210b and 210c can be configured as APs or as battery-operated non-APs STAs such as devices operating on the network that are enabled to be synchronized by the network and used elsewhere, for example mobile communication devices including wireless displays or phones. FIG. 2 is merely an example architecture having three network STAs; however, more or less than three may operate on the network.

Figure 3:
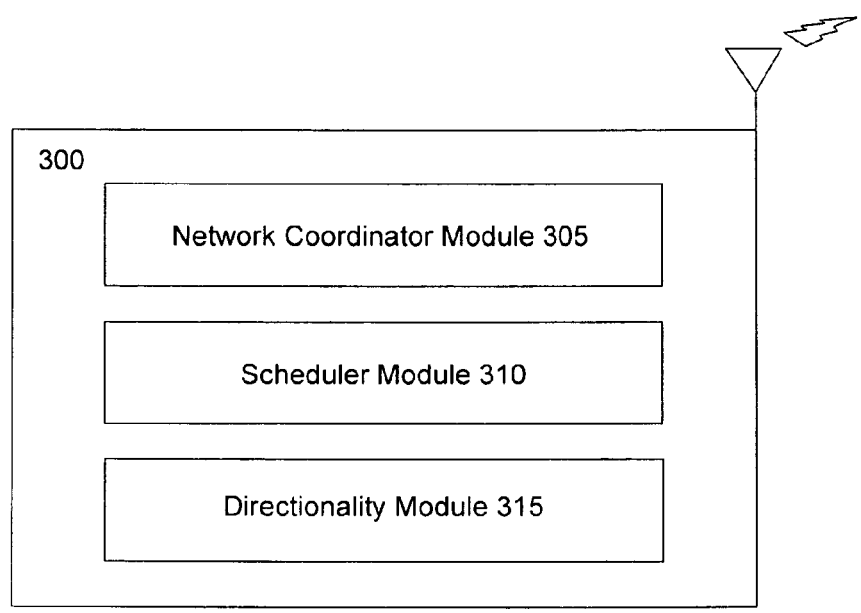
FIG. 3 shows an example network coordinator, PCP or AP in accordance with various aspects of the present disclosure.

FIG. 3 shows an example network coordinator or PCP or AP in accordance with various aspects of the present disclosure. The example network coordinator or PCP or AP is shown having a network coordinator module 305, a scheduler module 310 and a directionality module 315. The network coordinator module can be configured to coordinate operation in one or more wireless network architecture modes. For example, the wireless network modes can include infrastructure BSS, IBSS or PBSS. The network coordinator module can also be configured to communicate to a network station or STAs which mode of the one or more wireless network architecture modes is active for communication. The network stations can be a wireless device that is arranged to operate in the infrastructure mode and enable connection with a wireless access point.

The network coordinator module can also include a scheduler module that is configured to schedule communication to the network station. The network coordinator module can also include a directionality module that is configured to directionally operate in a high-frequency or millimeter wave band, such as a 60 GHz network architecture.

In some aspects, the network coordinator module, the scheduler module, or both are arranged to transmit a beacon frame. The beacon frame can include an information bit-field that has a first value if the network coordinator module transmits the beacon frame, a second value if network coordinator module transmits the beacon frame and is configured to act as an access point, and a third value if any network station in addition to the network coordinator module can transmit the beacon frame. In some aspects, the information bit-field is configured to identify an operational setting of the network architecture.

In some aspects, the network coordinator or PCP or AP can append a basic service set information bit-field to a capability information field in a frame. The frame can be a beacon frame, an association response frame and/or a probe response frame. The basic service set information bit-field can be arranged to have a first value if the network coordinator transmits the frame and a second value if an access point other than the network coordinator is configured to transmit the frame.

In some aspects, a wireless network station, such as an access point or a network coordinator, can be configured to transmit a management/extension frame including a CBP only field. The CBP only field can be arranged to indicate whether the wireless station has included a schedule information element as part of the frame, wherein the frame can be a beacon frame and/or an announce frame. In some aspects, the CBP only field can be set to a first value if the frame includes a schedule information element or set to a second value if the frame does not contain the schedule information element. In some aspects, if the CBP only field is set to the first value, the wireless station is arranged to determine channel allocations made by a network coordinator for a given beacon interval by using the schedule information element included in the frame. In some aspects, if the CBP only field is set to the second value, the wireless station is arranged to determine that an entire beacon interval is allocated as a contention-based period.

In some aspects, the PCP can send beacons while operating in the PBSS. Frame formats can be extended to allow a STA (AP/PCP) to indicate that a PBSS network architecture is in use or, conversely, that it is not in use to support the PBSS architecture in the 802.11. An information bit-field or PBSS can be defined in the Beacon frame or in part of the mmWave Capability Information field which could be set to one by a PCP transmitting a Beacon frame, and could be set to zero by an AP transmitting a Beacon frame or Probe Response frame. This way, STAs can identify which network architecture is in operation in the mmWave band.

Figures 4, 5, 6:
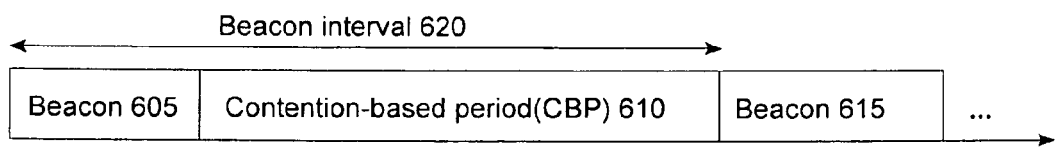
FIG. 4 shows an example Capability Information field in accordance with various aspects of the present disclosure.
FIG. 5 shows an example BSS type field in accordance with various aspects of the present disclosure.
FIG. 6 shows an example beacon interval structure in accordance with various aspects of the present disclosure.

FIG. 4 shows an example Capability Information field in accordance with various aspects of the present disclosure. The example Capability Information field can contain a number of subfields, such as subfields 405-415 that are used to indicate requested or advertised optional capabilities. The length of the Capability Information field can be 2 octets; however, other suitable lengths may be used. Each Capability Information subfield can be interpreted according to a management/extension frame subtype. For example, subfield 405 can be BSS type field with bits B0-B1, subfield 410 can be CBP only field with fields B2 and subfield 415 with bits B3-B7 can be reserved of other or future uses.

The CBP only subfield 410 can indicate the type of link access provided by the PCP/AP in the data transmission time (DTT) of the beacon interval (BI). An AP/PCP can set the CBP only bit to 1 when the entirety of the DTT portion of the B1 is allocated as a CBP for random access. An AP/PCP can set the CBP only bit to 0 when the allocation of the DTT portion of the B1 is provided by the AP/PCP through the Extended Schedule element.

In some aspects, APs can set the ESS subfield to 1 and the IBSS subfield to 0 within transmitted Beacon or Probe Response management frames. STAs within an IBSS set the ESS subfield to 0 and the IBSS subfield to 1 in transmitted Beacon or Probe Response management frames.

FIG. 5 shows an example BSS type field 405 from FIG. 4, which indicates the type of BSS established by the STA transmitting the mmWave Beacon in accordance with various aspects of the present disclosure. Field 505 identifies B0, field 510 identifies B1, and field 515 identifies BSS type. For example, if both B0 and B1 are 1, then the BSS type identifies infrastructure BSS. If B0 is 1 and B1 is 0, then the BSS type is PBSS. If B0 is 0 and B1 is 1, then the BSS type is IBSS. If both B0 and B1 are 0, then the BSS type is reserved.

In accordance with some aspects, the network architecture and basic medium access mechanism in 60 GHz is based on time divisional multiple access or TDMA as a channel access method. In TDMA, the channel schedule is sent by the PCP/AP to all STAs in the network. However, transmission in a BSS setting may use random access which does not require scheduling (i.e., schedule-free). Furthermore, non-AP/non-PCP STAs that are battery operated may need to parse a potentially long and complex channel schedule, which may not be necessary in a BSS setting or even select PBSS usages.

FIG. 6 shows an example beacon interval in accordance with various aspects of the present disclosure. In some aspects, a method that allows the PCP/AP to easily notify STAs that the channel schedule for the network is provided or not is provided to support BSS and simple PBSS usages and to promote power saving. The example beacon interval is shown having beacon field 605 and beacon field 615 surrounding CBP only field 610. A beacon interval 620 is shown as representing the length of beacon field 605 and CBP only field 620. The CBP only field, also shown at subfield 410 in FIG. 4, can indicate whether the PCP/AP has included the Extended Schedule IE as part of the Beacon or Announce frame it transmits.

If the CBP only field is set to zero, the STA needs to parse the received frame looking for the Extended Schedule IE in order to figure out which allocations the PCP/AP has made in the beacon interval. On the other hand if the CBP only field is set to one, the STA knows the current frame does not contain the Extended Schedule IE. In this case, the STA assumes that the entire beacon interval is allocated as a contention-based period as indicated in FIG. 6.

The CBP only bit provides a considerable implementation simplification and power saving opportunities. It allows the AP/PCP to very easily allocate a CBP without having to use the Extended Schedule IE. It does not require non-AP/non-PCP STAs to have to decode the Extended Schedule IE, hence saving power. It can provide an easy and simple way to serve traditional BSS usages and simple PBSS usages.

Although the above disclosure discusses what is currently considered to be a variety of useful embodiments, it is to be understood that such detail is solely for that purpose, and that the appended claims are not limited to the disclosed embodiments, but, on the contrary, are intended to cover modifications and equivalent arrangements that are within the spirit and scope of the appended claims.

What is being claimed:

1. A first wireless communications device for communicating in a 60 GHz wireless network, the first device comprising:
   a network scheduler module to schedule directional wireless communications for other wireless communication devices in the 60 GHz wireless network;
   wherein the first device is configured to transmit a beacon frame, the beacon frame indicating a data transmission time of a beacon interval, the data transmission time to occur subsequent to the beacon frame, the data transmission time being a time during which other devices in the network may transmit; and
   wherein the beacon frames each contain a capability information field, the capability information field containing a sub-field to limit use to contention-based access during the data transmission time, the sub-field indicating a type of link access provided by the first device in the data transmission time, the type of link access provided in the data transmission time of the beacon interval, wherein the type of link access comprises a random access, the type of link access being selected by the first device when an entirety of the data transmission time is allocated as a contention based period for the random access.

2. The first device according to claim 1, wherein the capability information field contains another sub-field to indicate a basic service set (BSS) type for the network.

3. The first device according to claim 2, wherein the another sub-field indicates whether the BSS type is an infrastructure BSS or a personal BSS (PBSS) or an independent BSS (IBSS).

4. A method of communicating in a wireless network, comprising:
   transmitting, by a first device in the network, a beacon frame in a 60 GHz wireless network, the beacon frame indicating a data transmission time of a beacon interval, the data transmission time to occur subsequent to the beacon frame, the data transmission time being a time during which other devices in the network may transmit in a directional manner;

wherein the beacon frame contains a capability information field, the capability information field containing a sub-field to limit use to contention-based access during the data transmission time, the sub-field indicating a type of link access provided by the first device in the data transmission time, the type of link access provided in the data transmission time of the beacon interval, wherein the type of link access comprises a random access, the type of link access being selected by the first device when an entirety of the data transmission time is allocated as a contention based period for the random access.

5. The method according to claim 4, wherein the capability information field contains another sub-field to indicate a basic service set (BSS) type for the network.

6. The method according to claim 5, wherein the another sub-field indicates whether the BSS type is an infrastructure BSS or a personal BSS (PBSS) or an independent BSS (IBSS).

7. A first wireless communications device for communicating in a 60 GHz wireless network, the first device configured to:

receive a beacon frame from a second wireless communications device, the beacon frame indicating a data transmission time of a beacon interval, the data transmission time to occur subsequent to the beacon frame, the data transmission time being a time during which devices other than the second device may communicate directionally in the network;

wherein the beacon frame contains a capability information field, the capability information field containing a sub-field to limit use to contention-based access during the data transmission time, the sub-field indicating a type of link access provided by the first device in the data transmission time, the type of link access provided in the data transmission time of the beacon interval, wherein the type of link access comprises a random access, the type of link access being selected by the first device when an entirety of the data transmission time is allocated as a contention based period for the random access.

8. The first device according to claim 7, wherein the capability information field contains another sub-field to indicate a basic service set (BSS) type for the network.

9. The first device according to claim 8, wherein the another sub-field indicates whether the BSS type is an infrastructure BSS or a personal BSS (PBSS) or an independent BSS (IBSS).

10. A method of communicating in a 60 GHz wireless communications network, the method comprising:

receiving a beacon frame that indicates a data transmission time of a beacon interval, the data transmission time to occur subsequent to the beacon frame, the data transmission time being a time during which devices in the network may communicate directionally in the 60 GHz wireless communications network;

wherein the beacon frame contains a capability information field, the capability information field containing a sub-field to limit use to contention-based access during the data transmission time, the sub-field indicating a type of link access provided by the first device in the data transmission time, the type of link access provided in the data transmission time of the beacon interval, wherein the type of link access comprises a random access, the type of link access being selected by the first device when an entirety of the data transmission time is allocated as a contention based period for the random access.

11. The method according to claim 10, wherein the capability information field contains another sub-field to indicate a basic service set (BSS) type for the network.

12. The method according to claim 11, wherein the another sub-field indicates whether the BSS type is an infrastructure BSS or a personal BSS (PBSS) or an independent BSS (IBSS).

* * * * *